INVENTOR.
ROBERT C. EBERSOLD

Feb. 19, 1957 R. C. EBERSOLD 2,781,879
MACHINE TOOL TRANSMISSION AND CONTROL THEREFOR
Filed Dec. 17, 1953 4 Sheets-Sheet 2
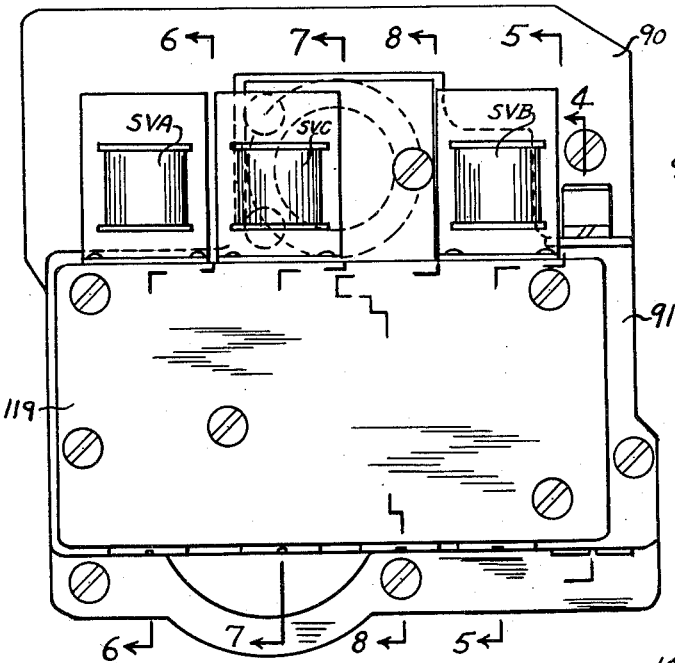
Fig. 3
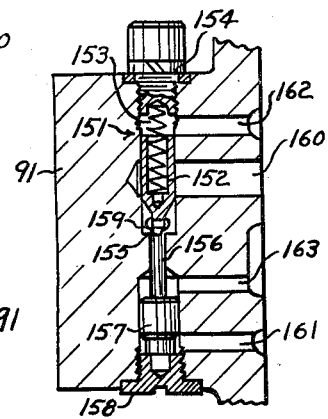
Fig. 4
| | SOLENOIDS | | | SHUT. VAL. | SPINDLE CLUTCHES | | | | |
|---|---|---|---|---|---|---|---|---|---|
| | SVA | SVC | SVB | VD | C1 | C2 | C3 | C4 | C5 |
| OFF | O | O | O | X | D | D | D | X | X |
| SPEED 1 | X | O | O | O | X | D | D | X | D |
| SPEED 2 | O | X | O | O | D | X | D | X | D |
| SPEED 3 | X | X | O | X | D | D | X | X | D |
| SPEED 4 | X | O | X | O | X | D | D | D | X |
| SPEED 5 | O | X | X | O | D | X | D | D | X |
| SPEED 6 | X | X | X | X | D | D | X | D | X |
Fig. 10
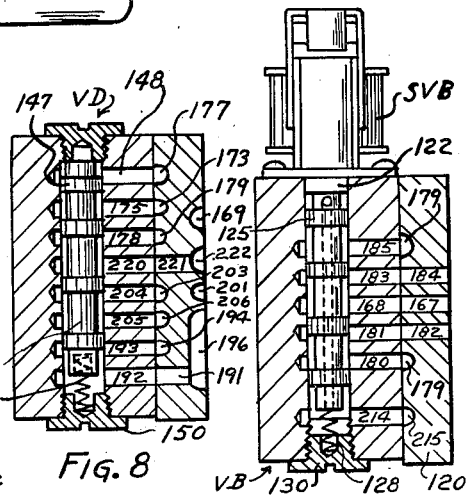
Fig. 8      Fig. 5
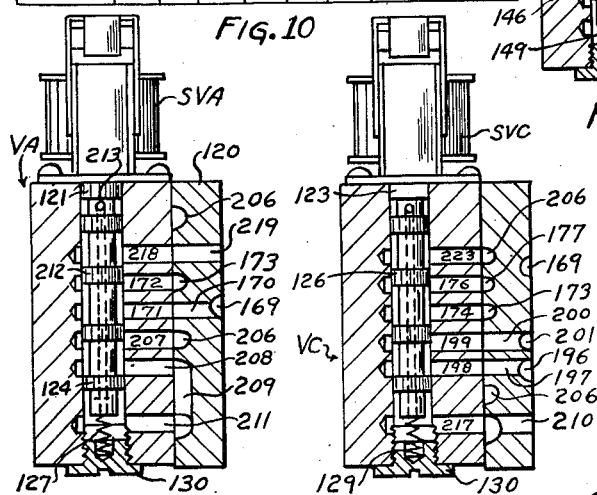
Fig. 6      Fig. 7
INVENTOR.
ROBERT C. EBERSOLD
BY Hudson, Boughton,
Williams, David & Hoffmann
ATTORNEYS INVENTOR.
ROBERT C. EBERSOLD
BY Hudson, Boughton,
Williams, Davis & Hoffman
ATTORNEYS

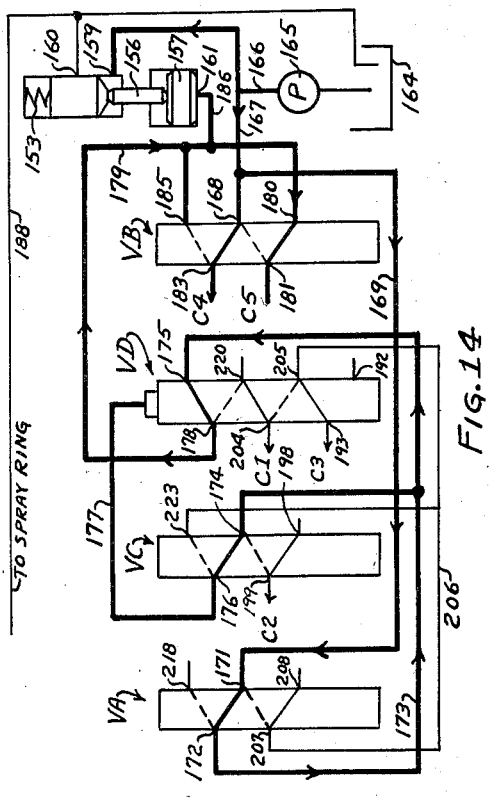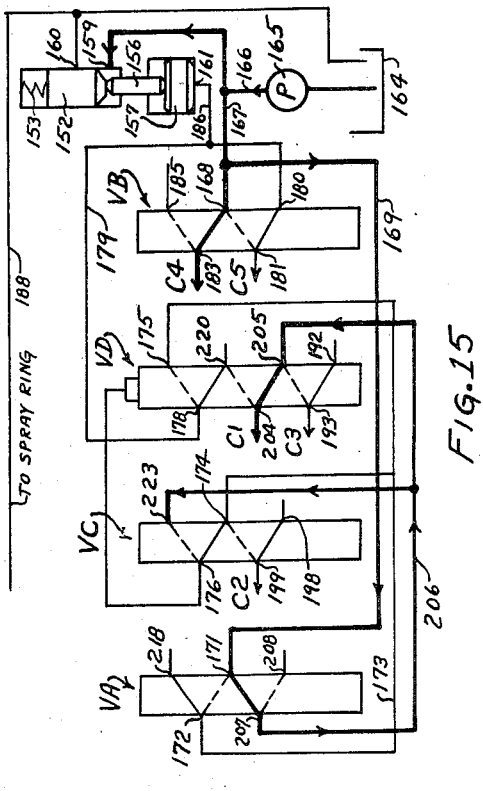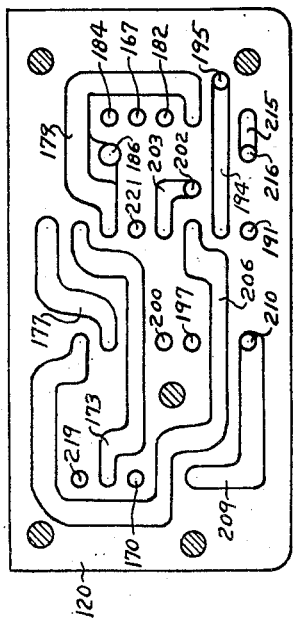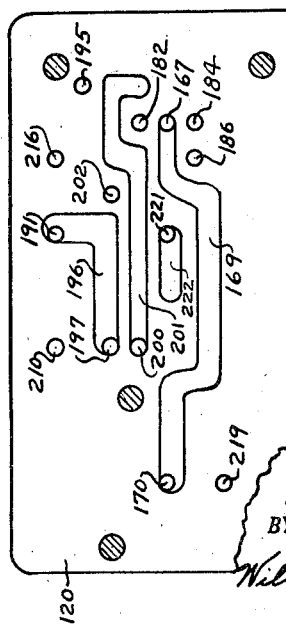

United States Patent Office 2,781,879
Patented Feb. 19, 1957

2,781,879

MACHINE TOOL TRANSMISSION AND CONTROL THEREFOR

Robert C. Ebersold, Chagrin Falls, Ohio, assignor to The Warner & Swasey Company, Cleveland, Ohio, a corporation of Ohio Application December 17, 1953, Serial No. 398,759

17 Claims. (Cl. 192—4)

This invention relates to machine tools and, more particularly, to an improved means for controlling the operation of a plurality of fluid pressure actuated devices such as the clutches in a change speed transmission of a lathe or the like.

It is customary to provide machine tools, such as lathes or the like with one or more transmissions for deriving a plurality of different speeds of a driven shaft or shafts from a fixed speed of a drive shaft. For example, the head stock of a lathe has such a transmission to provide a plurality of speeds of the work spindle. In one form of such transmission a plurality of constantly meshing gears are provided between the driving and driven shafts with fluid actuated clutches to selectively render certain only of said gears operative thereby providing a selected speed of the driven shaft or braking thereof. A transmission of this nature is shown in Curtis et al., United States Letters Patent No. 2,644,222 wherein four fluid operated clutches provide four speed ratios of a driven shaft relative to the speed of the drive shaft under control of three solenoid operated valves. To provide additional speed ratios in such a transmission requires the provision of additional gears together with an additional clutch or clutches and this would normally require a corresponding increase in the number of solenoid operated valves required for operation. An increase in the number of such valves is, however, undesirable not only because of the increased cost but also because it complicates the control switches and/or circuits for the solenoids since these must be designed to provide the desired combinations of valve operations with a minimum of thought and effort on the part of the operator.

An object of this invention is to provide an improved control mechanism for fluid operated devices of a machine tool or the like wherein the control of the devices is electrically effected through use of solenoid operated valves, the mechanism being characterized by at least one of the valves being fluid pressure operated under control of one or more of the solenoid operated valves so that an increased number of devices can be controlled without increase in the number of the solenoid operated valves or complication of the electrical control circuit.

Another object of the invention is to provide an improved transmission for a machine tool wherein a plurality of different speeds of a driven shaft are provided through selective utilization of constantly meshed gears by selective actuation of fluid operated clutches under control of valves at least one of which is fluid pressure operated and is under the control of one or more solenoid actuated valves.

A further object of the invention is to provide an improved transmission for a machine tool as defined above and wherein the driven member thereof is braked by simultaneous engagement of two of the clutches on a single shaft and means are provided for effecting a reduction of the fluid pressure supplied to the clutches when the latter are actuated to perform the braking function.

A more specific object of the invention is to provide an improved transmission as defined in the preceding paragraph and wherein one of the control valves acts to supply fluid pressure to a fluid pressure actuated means that is operative to effect the aforementioned reduction of fluid pressure for the clutches when the valves are positioned for actuating the clutches to perform the braking function.

A still more specific object of the invention is to provide an improved transmission as defined above wherein any one of six speeds of the driven shaft of the transmission or braking of the driven shaft are provided by selective operation of only four control valves, three of which are solenoid operated and one of which is fluid pressure operated under control of the solenoid operated valves.

An additional object of the invention is to provide an improved transmission for a machine tool employing constantly meshed gears which are selectively employed by fluid pressure operated clutches under control of a plurality of two-position, multiple passage valves which are provided as a compact unitary assemblage on a portion of the housing for the transmission whereby the control mechanism is easily accessible for servicing and may be removed as a unit.

The invention further resides in certain novel features of the construction and arrangement of the parts of the apparatus in which the invention is embodied, and further objects and advantages thereof will be apparent to those skilled in that art to which the invention pertains from the following description of the presently preferred embodiment thereof taken in conjunction with the accompanying drawings forming a part of this application, and in which:

Fig. 3 is an end elevational view of a portion of the housing of the transmission showing the control mechanism in place thereon;

Fig. 4 is a detached view, partially in elevation and partially in vertical section, taken substantially on the irregular section indicating line 4—4 of Fig. 3 and showing the mechanism for controlling the pressure of the fluid in the system;

Fig. 5 is a view similar to Fig. 4 taken substantially on the irregular section indicating line 5—5 of Fig. 3 and showing one of the solenoid operated valves;

Fig. 6 is a view similar to Fig. 4 taken substantially on the irregular section indicating line 6—6 of Fig. 3 and showing another of the solenoid operated valves;

Fig. 7 is a view similar to Fig. 4 taken substantially on the irregular section indicating line 7—7 of Fig. 3 and showing still another of the solenoid operated valves;

Fig. 8 is a view similar to Fig. 4 taken substantially on the irregular section indicating line 8—8 of Fig. 3 and showing the fluid pressure operated valve;

Figure 9:
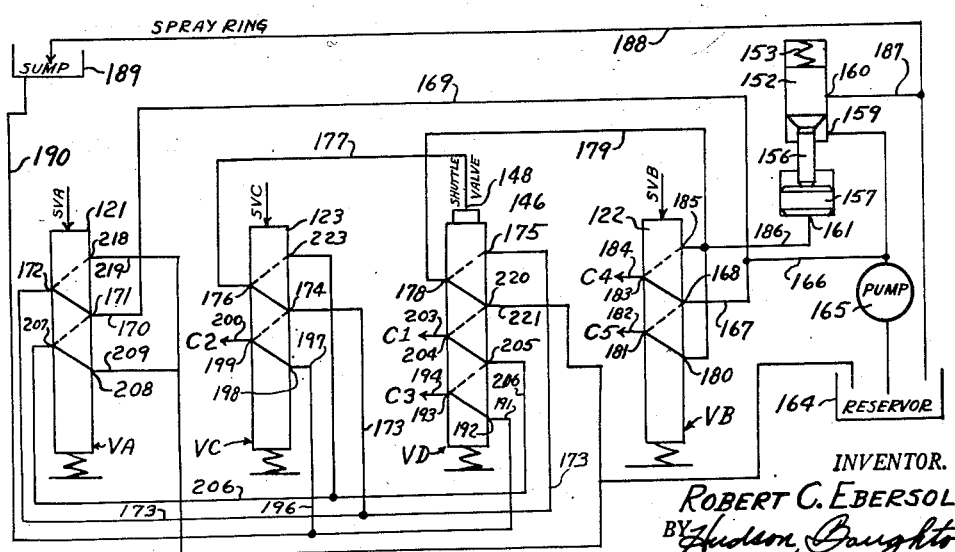

Fig. 9, Sheet 1, is a diagrammatic representation of the fluid pressure system and control valves illustrating in full lines the paths for fluid through the valves when the latter are not operated and in broken lines the paths for the fluid when the valves are operated;

Fig. 10, Sheet 2, is a chart showing the operated and non-operated conditions of the solenoids, valves, and clutches for effecting braking or any one of the available speed ratios provided by the transmission;

Fig. 11 is a schematic representation of a manual switch means which may be utilized to control energization of the solenoids for the valves and thereby control the operation of the transmission;

Fig. 12 is a detached elevational view of the front surface of a mounting plate for the control mechanism illustrating the fluid passageways and openings provided therein for interconnection of the valves of the control mechanism;

Fig. 13 is an elevational view of the rear surface of the mounting plate shown in Fig. 12 illustrating fluid passageways provided therein for the control mechanism, the plate being shown inverted with respect to Fig. 12 to facilitate identification of the openings extending through the plate and providing interconnection of the several passageways;

Fig. 14 is a diagrammatic representation of the fluid pressure system, the illustration being similar to that of Fig. 9 but showing only the paths for the fluid when the valves have been positioned to effect braking of the driven shaft; and Fig. 15 is a view similar to Fig. 13 but illustrating the paths for the fluid when the valves have been positioned to provide the first speed of the driven shaft.

The control mechanism and transmission of the invention are here illustrated and described as embodied in a machine tool of the type disclosed in the aforementioned Curtis et al. Patent 2,644,222 to which reference may be had for those details of the machine which do not form a part of this invention and hence are not here shown. It will be understood, however, that the invention is not restricted to use in a machine tool of the type disclosed in the above-mentioned patent but may be employed in machines of other types.

Figure 1:
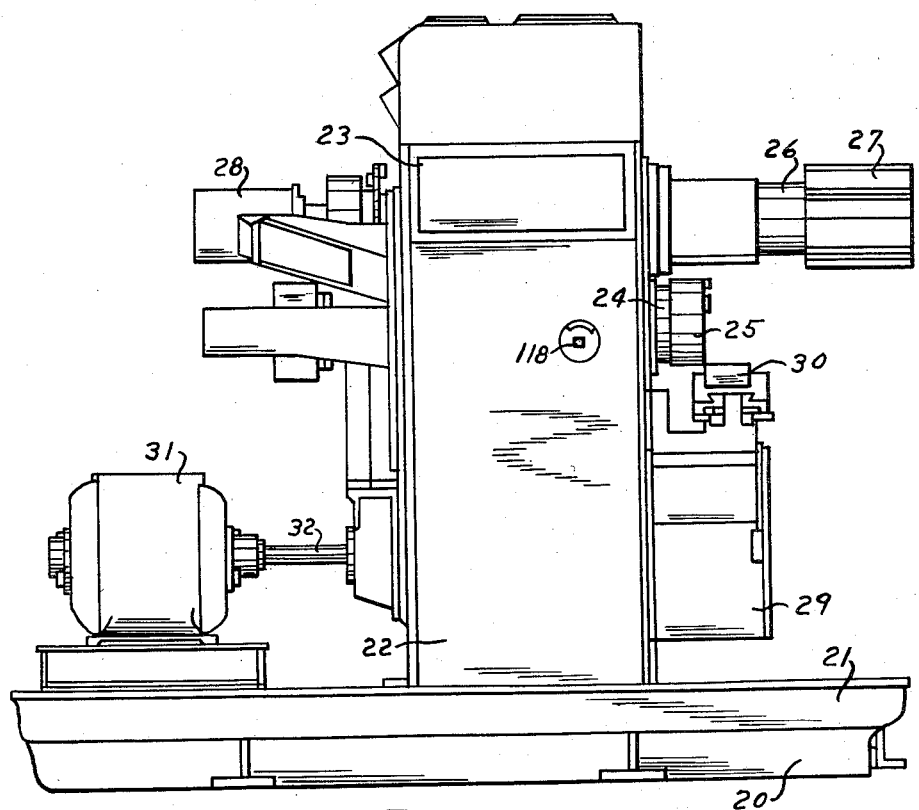
Fig. 1 is a front elevational view of a machine tool in which the invention is embodied.

The general outline and main portions of the machine tool of the type disclosed in the aforementioned patent are illustrated in Fig. 1. As shown therein, this machine comprises a base 20 which supports the pan 21 and the vertically extending frame and housing structures, the portion 22 of the latter below the spindle being termed the frame while the upper portion 23 constitutes the headstock. The headstock rotatably supports a spindle 24 which is provided on its outer end with a suitable chuck 25. The headstock also supports a carrier 26 which is both reciprocable and indexingly rotatable in the headstock. This carrier is provided at one end with a polygonal portion 27 upon which tools may be adjustably mounted. The other end of this carrier is provided with a control turret 28. Beneath the spindle 24, the frame 22 is provided, on the right hand side as viewed in Fig. 1, with an extension 29 which has upwardly inclined faces on its upper surface that slidably support a pair of cross slides, such as 30, one only of which appears in Fig. 1. A main motor 31 for the machine is mounted on the base 20, exteriorly of the frame 22, and has the shaft thereof coupled to a main drive shaft 32 which extends into the frame 22 and comprises a portion of the transmission. The parts of the machine tool thus far described are conventional and the details of their construction and mode of operation are fully described in the aforementioned Curtis et al. Patent No. 2,644,222.

Figure 2:
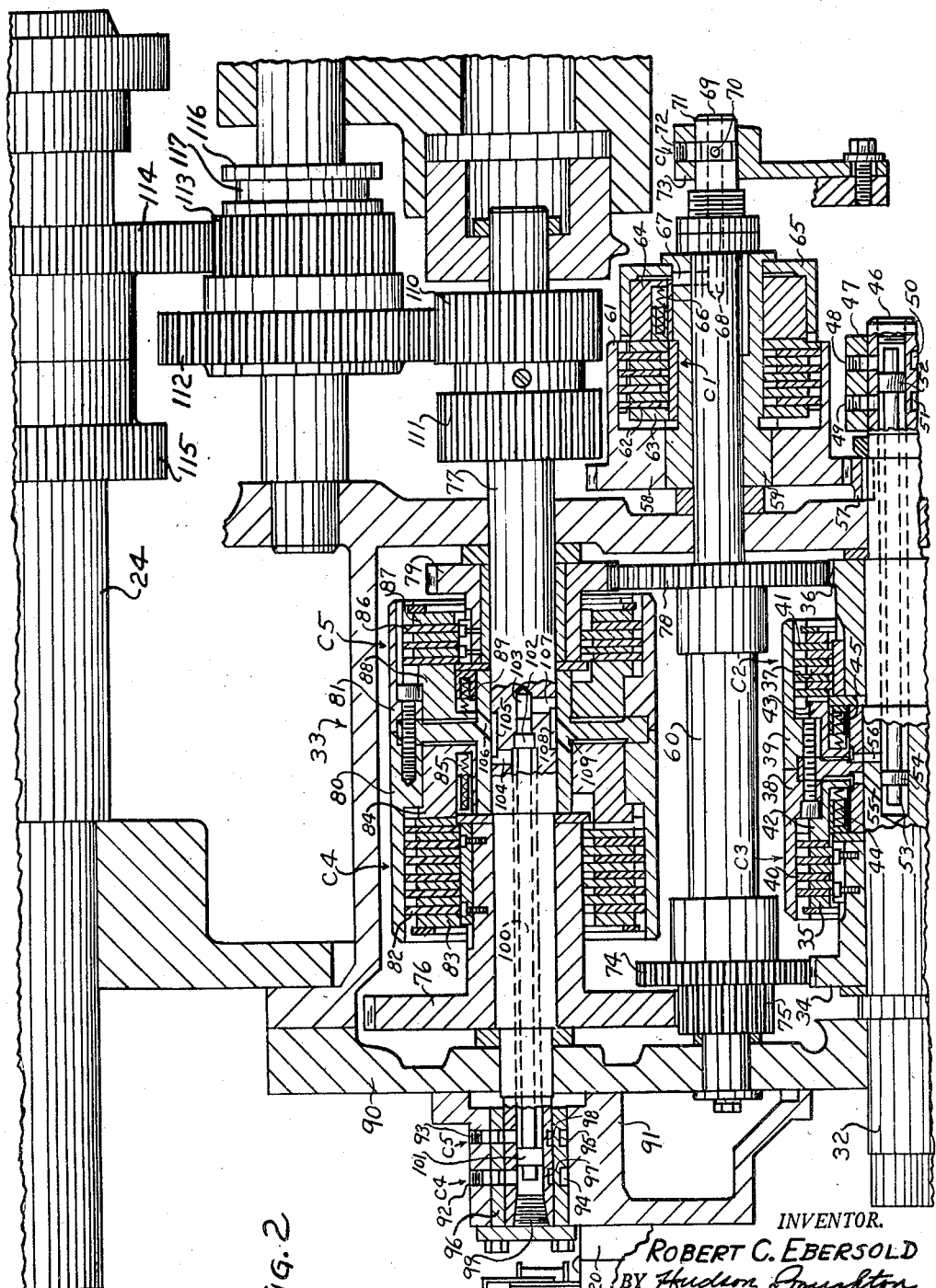
Fig. 2 is an enlarged sectional view of the improved transmission in the machine tool illustrated in Fig. 1.

Referring now to Fig. 2, it will be seen that the drive shaft 32 is rotatably journaled in a housing 33, forming a part of the frame 22, and constitutes the input or drive shaft of the transmission. Within the housing 33 the shaft 32 has a gear 34 freely rotatable thereon and this gear has a sleeve portion carrying friction plates 35 of a friction clutch. The shaft 32 also has a gear 36 freely rotatable thereon in spaced relationship to the gear 34 and this gear 36 likewise has a sleeve portion on which are provided friction clutch plates 37. Intermediate the adjacent ends of the sleeve portions of the gears 34 and 36 are clutch housing members 38 and 39 which are connected together and secured to the shaft 32 for rotation therewith. The clutch housing member 38 has a plurality of clutch plates 40 mounted therein which are adapted to cooperate with the clutch plates 35, and the clutch housing 39 has a plurality of clutch plates 41 therein which are adapted to cooperate with the clutch plates 37.

The clutch housing member 38 is provided with circular recesses which slidably mount an annular piston or clutch actuator 42 that is adapted to be moved by fluid under pressure to effect engagement of the clutch plates 35 and 40 thereby clutching gear 34 for rotation with the shaft 32. Likewise, the clutch housing 39 has similar annular recesses slidably mounting an annular piston or clutch actuator 43 adapted to be actuated by fluid under pressure to engage the clutch plates 37 and 41 and thereby couple the gear 36 to the shaft 32 for rotation therewith. The clutch actuator or piston 42 is normally held in inactive position by springs 44 so that the shaft 32 may rotate independently of the gear 34. Likewise, springs 45 normally hold the piston or clutch actuator 43 in inactive position thereby permitting rotation of the shaft 32 relative to gear 36.

Fluid under pressure for operation of the clutch pistons or actuators 42 and 43 is supplied from a suitable source, as hereinafter described, to passageways in the shaft 32 and thence into the clutch housings 38 and 40. For this purpose, the end of the shaft 32, opposite to that to which the motor 31 is connected, is axially bored and the end of this bore is provided with a plug 46. Surrounding the portion of the shaft 32 adjacent the plug 46 is a stationary member 47 provided with tapped inlet openings 48 and 49 to which suitable pipes or conduits are adapted to be attached. The inner end of the opening 48 communicates with an annular groove 50 about the shaft 32 and the inner end of the opening 49 communicates with a similar annular groove 51 on the shaft.

The annular grooves 50 and 51 each have an opening therethrough to the interior of the bore in the shaft 32. Intermediate these two openings, the bore in the shaft 32 is provided with an annular plug member 52 which supports one end of a hollow tube 53. The other end of this tube 53 terminates in spaced relationship to the inner end of the bore in the shaft and is supported therein by an annular plug member 54 which is disposed intermediate passageways 55 and 56 in the shaft 32 and which communicate respectively with the annular recesses between the piston members 42, 43 and their adjacent housing members 38, 39. It will be evident from this construction that fluid under pressure supplied to the opening 48 is communicated through the tube 53 and the passageway 55 to effect engagement of the clutch plates 35 and 40 while fluid pressure supplied through the opening 49 is transmitted intermediate the tube 53 and the adjacent wall of the bore in the shaft 32 to the opening 56 and hence acts upon the annular member or piston 43 to engage the clutch plates 37 and 41.

The shaft 32 also is provided with a gear 57 which is connected for rotation with the shaft and meshes with a gear 58 that is freely rotatable upon a sleeve member 59 attached to a rotatable countershaft 60. The gear 58 has an annular sleeve portion 61 provided with friction clutch plates 62 and the sleeve member 59 carries friction clutch plates 63 which are adapted to engage the plates 62 to couple the gear 58 to the shaft 60. The plates 62 and 63 are actuated into driving engagement by an annular piston or actuator 64 which is adapted to be moved within a housing 65 carried by the sleeve member 59 by fluid under pressure, the piston being restored to non-operated position by springs 66 as will be readily understood.

Fluid under pressure for operation of the piston 64 is supplied to the housing 65 through an opening 67 in the sleeve member 59 which communicates with a bore 68 extending axially of the countershaft 60. The outer end of the bore 68 is closed by a plug member 69 and the bore communicates through a radial opening 70 with an annular groove 71 about the shaft 60 which, in turn, communicates with a threaded opening 72 in a stationary member 73 suitably supported upon the frame of the machine. It will be evident from this construction that the gear 58 and the shaft 60 are free for relative rotation but may be coupled together by application of fluid under engaged and hence the drive is from shaft 32 through gears 57, 58, shaft 60, gears 78 and 79 to the shaft 77. For the fifth speed, clutches C2 and C5 are engaged. Consequently, the drive is then from shaft 32 through gears 36, 78 and 79 to the shaft 77. The sixth speed of shaft 77 is provided by engagement of clutches C3 and C5. Therefore, the drive is now from shaft 32 through gears 34, 74, shaft 60 and gears 78 and 79.

The aforementioned selective engagement of the clutches is effected by fluid pressure under control of a plurality of solenoid operated valves and a fluid pressure operated valve, the control mechanism being such that only three solenoid operated valves and one fluid pressure operated valve are utilized to provide the six speeds and braking of the driven shaft. The valves and the interconnecting passageways therefor are provided in a compact unitary structure detachably mounted upon the housing 91 on the end face of the transmission so that the mechanism is readily accessible and may be easily installed or detached as a unit. This compact unitary construction is achieved by providing a valve block 119 in which the chambers for the several valves are provided, see Fig. 3, the valve block being mounted upon the housing member 91 by a mounting plate 120 which has a plurality of openings therethrough and interconnecting grooves on the two side faces thereof, as will be evident from Figs. 12 and 13, providing for interconnection of the passageways of the valves and distribution of fluid therethrough to the clutches as well as drainage of the valves and clutches.

The three solenoid operated valves, designated respectively VA, VB and VC, are substantially identical and, as shown in Figs. 5, 6 and 7, each comprises an elongated valve body 121, 122 and 123, respectively. Each of these valve bodies has a plurality of spaced lands, such as 124, 125, and 126, respectively, slidable in vertical bores in the valve block member 119 with reduced diameter portions of each valve body intermediate its lands providing passages for fluid under pressure between laterally extending openings in the block which constitute the several ports of the valves. These lateral openings or ports are all formed on the inner side of the valve block 119, as will be apparent from the drawings, and these openings cooperate with the openings and grooves in the adjacent face of plate 120 as will hereinafter appear. The body of each of the valves VA, VB and VC is normally held in its uppermost or non-operated position by a spring 127, 128 and 129, respectively, acting between the lower end of the corresponding valve body and a plug such as 130 which closes the chamber or bore of the valve.

The valve body 121 is connected with the armature of an electromagnetic actuator including solenoid SVA; the valve body 122 is connected with the armature of a similar electromagnetic device comprising solenoid SVB; and the valve body 123 is connected with the armature of an electromagnetic device comprising the solenoid SVC. The solenoids SVA, SVB and SVC are adapted to be selectively energized and when so energized operate to move the corresponding valve body downwardly, as viewed in the drawings, that is against the force of the springs, such as 127, 128 or 129, thereby causing the lands of the valve bodies to place certain of the ports in communication with each other and terminate communication between other of the ports which are in communication when the valves are not operated. The details of these communications will be hereinafter described.

The solenoids SVA, SVB and SVC may be controlled by individual manually actuatable switches or may be controlled by separate switches operated by dogs on a control turret of the machine in a manner similar to that disclosed in the aforementioned Curtis et al. Patent 2,644,222. These solenoids may also be selectively controlled by a single manually operable drum-type switch such as is schematically disclosed in Fig. 11. A switch of this nature is conventional and hence the mechanical structure thereof need not be illustrated. It is sufficient here to note that such a switch, generally designated 131 in Fig. 11, comprises a rotatable body or drum of insulating material which may be selectively turned to a plurality of different positions and thereby establish different circuit relationships.

In the illustrated embodiment, the switch 131 has an "off" position and six "on" positions. In the "off" position, there are no circuits established to the solenoids SVA, SVB and SVC since, as will hereinafter appear, braking of the driven shaft is effected when each of the solenoid operated valves is in its non-operated position. This is indicated in the chart in Fig. 10 by the reference character O whereas the energization of the solenoids SVA, SVB and SVC are indicated in this chart by the character X. Thus, with reference to both Figs. 10 and 11, it will be seen that to provide the first speed of the driven shaft, the switch 131 is moved to the position designated 1. This disposes a contact 132 on the rotatable portion of the switch in engagement with a stationary contact 133. The contact 133 is connected to one terminal of the solenoid SVA while the other terminal of the latter is connected to a power supply line L2. The contact 132 and each of the other subsequently described contacts on the switch 131 are connected to a second power supply line L1. Hence, with the switch 131 positioned as just mentioned and with electrical power supplied to the lines L1 and L2, the solenoid SVA is energized. In like manner, positioning of switch 131 to the second position thereof engages a contact 134 thereon with a stationary contact 135 thereby energizing solenoid SVC since the contact 135 is connected to one terminal of this solenoid and the other terminal thereof is connected to L2.

The third speed of the driven shaft is effected by energization of both solenoids SVA and SVC. Therefore in the third position of switch 131, a contact 136 thereon engages the contact 133 and a contact 137 engages the contact 135. Since contacts 136 and 137 are both connected to the power supply lines L1, both solenoids SVA and SVC are energized. For the fourth speed of the driven shaft, the switch 131 is moved to the fourth position thereby engaging a contact 138 with the stationary contact 133 and a contact 139 with a stationary contact 140. The contacts 138 and 139 are both connected to power line L1 and contact 140 is connected with one terminal of the solenoid SVB while the other terminal of the latter is connected with the power line L2. Also, as previously mentioned, solenoid SVA is connected between L2 and contact 133. Hence both solenoids SVA and SVB are energized. For the fifth speed, the switch 131 is moved to the fifth position thereof so that contacts 141 and 142 on the rotatable portion of the switch respectively engage contacts 135 and 140. Contacts 141 and 142 are both connected to power line L1 and hence solenoids SVC and SVB are both energized. For the sixth speed of the spindle the switch 131 is moved to its sixth position wherein contacts 143, 144 and 145 thereon respectively engage with the contacts 133, 135 and 140. Since contacts 143, 144 and 145 are all connected to L1, solenoids SVA, SVB and SVC are all energized.

In addition to the three solenoid operated valves, the valve block 119 also has a chamber or bore therein for the movable valve body 146 of the fluid pressure operated or shuttle valve VD, see Fig. 8. The valve body 146 is formed by a plurality of spaced lands such as 147 slidable within the bore or chamber for the valve and adapted to selectively provide communication between various of the ports of the valve which extend rearwardly of the valve block in the same manner as the ports for the solenoid operated valves. The fluid pressure for operating valve VD is supplied under control of the solenoid pressure to the opening 72, this fluid acting upon the piston 64 to engage the friction plates 62 and 63.

The countershaft 60 is also provided with a pair of integral gears 74 and 75 which are fixed for rotation with the shaft and with the gear 74 in constant mesh with the gear 34 on the shaft 32. The gear 75 is in constant mesh with a gear 76 which is freely rotatable upon the driven shaft 77 of the transmission, the gear 76 being adapted to be selectively connected to the shaft 77 for rotation therewith by a fluid pressure operated friction clutch. The countershaft 60 also has a gear 78 connected thereto for rotation therewith and this gear meshes with a gear 79 that is freely rotatable upon the driven shaft 77 in spaced relationship to the gear 76. The gear 79 likewise is adapted to be coupled with the shaft 77 for rotation therewith by a fluid pressure operated friction clutch.

The clutches for connecting gears 76 and 79 to the shaft 77 are similar to the clutches provided upon the drive shaft 32 and comprise similar housings 80 and 81 which are connected together and to the shaft 77 for rotation therewith. The housing 80 has an annular opening therein in which spaced friction plates 82 are disposed and connected to rotate with the housing. These plates are adapted to cooperate with friction plates 83 also within the housing and which are connected to a sleeve portion of the gear 76. The friction plates 82 and 83 are actuated into engagement by a fluid pressure operated annular piston or actuator 84 which is slidable in an annular recess of the housing 80 and is normally held in clutch disengaged position by springs 85. In like manner, the housing 81 has spaced friction plates 86 connected therewith which are adapted to engage with friction plates 87 connected with a sleeve portion of the gear 79. This engagement of the friction plates 86 and 87 is effected by a fluid pressure operated annular piston or actuator 88 which is normally held in clutch disengaged position by springs 89.

Fluid pressure is supplied to the clutch actuators or pistons 84 and 88 through passages provided in the shaft 77 in a manner similar to the passages in shaft 32. Thus, it will be noted that the end face plate 90 of the transmission supports a housing member 91 in which the end of the shaft 77 is rotatably received. This housing member 91 has tapped openings 92 and 93 therein communicating respectively with annular grooves 94 and 95 in a shaft bushing member 96 and these annular grooves in turn, respectively, communicate through radial openings with annular grooves 97 and 98 in the periphery of the shaft 77. The grooves 97 and 98, in turn, communicate through radial openings with an axially extending bore in the shaft 77, the end of this bore being closed by a plug 99.

Supported within the bore in shaft 77 is a hollow tube 100, the tube being maintained with its outer periphery spaced from the interior wall of the bore by spaced annular members 101 and 102. The annular member 101 is placed intermediate the openings communicating with the grooves 97, 98 to isolate these from each other while the annular member 102 and the inner end of the tube 100 are received in reduced diameter portions 103 of the inner end of the bore. At one side of the member 102 the shaft 77 is provided with a radial opening 104 which communicates with an axially extending opening or recess 105 in the shaft and the latter, in turn, communicates with an inclined opening 106 in the clutch housing member 81 to allow fluid under pressure to enter the latter behind the piston or actuator 88. In like manner, the inner reduced diameter portion 103 of the bore communicates with a radially extending opening 107 and axial recess or opening 108 in the shaft and the latter communicates with an inclined opening 109 in housing member 80 to communicate fluid under pressure to this clutch housing behind the piston or actuator 84.

It will be apparent from the construction thus far described that the fluid under pressure applied to the opening 92 passes through the interior of the tube 100, the inner reduced diameter portion 103 of the bore, and the openings 107, 108, and 109 to actuate the piston 84 into clutch engaging position. Likewise, fluid under pressure applied to the opening 93 passes through the latter and the space between the shaft bore and tube 100 to and through the openings 104, 105, 106 to force the piston or actuator 88 into clutch engaging position.

The shaft 77 is also provided with a pair of integral gears 110 and 111 of equal size which are connected for rotation with the shaft and are adapted to be selectively engaged by a gear 112 of an axially slidable pair of unequal size gears, the gear 112 and the other gear 113 of which pair are adapted to selectively engage unequal sized gears 115 and 114, respectively, on the spindle 24. The gears 112 and 113 have an axially extending portion 116 provided with an annular groove 117 which is engaged by a suitable mechanism for effecting shifting of the gears as is fully disclosed in the aforementioned Patent 2,644,222. This mechanism includes a shaft 118, the outer end of which extends through the wall of the headstock 23 and is adapted to be manually turned by a crank or the like to effect shifting of the gears 112 and 113 so that the speeds provided by the driven shaft 77 of the transmission may be utilized to provide either a "high" or a "low" range of speeds of the spindle as is also explained in the aforementioned patent.

For ease in the subsequent description, the fluid operated clutch on the shaft 60 will be hereafter designated in its entirety as C1; the clutch on the drive shaft 32, comprising the friction plates 37 and 41, will be identified as fluid actuated clutch C2; the clutch on the drive shaft 32, comprising friction plates 35 and 40, will be identified as C3; the clutch on the driven shaft 77, comprising the friction plates 82 and 83, will be identified as C4; and the other clutch on the driven shaft 77 will be identified as C5. These clutches are adapted to be engaged, two at a time, to provide either braking of the driven shaft 77 or any one of six selected speeds of the driven shaft. Thus, as will be evident from Fig. 2 and the chart shown in Fig. 10, simultaneous engagement of clutches C4 and C5 and disengagement of clutches C1, C2 and C3 results in a braking action upon the driven shaft and hence on the spindle since the gears 76 and 79 are both connected with the shaft 77 and these gears mesh respectively with gears 75 and 78 which are integral upon the common countershaft 60. This condition of the clutches is identified in the chart by the symbol X for clutches C4 and C5, designating that these clutches are engaged, while the character D for clutches C1, C2 and C3 indicates that they are connected to drain and hence are disengaged.

In a similar manner, with reference to Figs. 2 and 10, it will be seen that for the first speed of the driven shaft 77 clutches C1 and C4 are engaged while clutches C2, C3 and C5 are disengaged and connected to drain. The engagement of clutch C1 provides a driving relationship from the shaft 32 through the gears 57 and 58 to the countershaft 60, and from the latter through the gear 75 to the gear 76 which is now coupled with the driven shaft 77 by the engagement of the clutch C4. For the second speed of the driven shaft, only clutches C2 and C4 are engaged and the other clutches are disengaged. Hence the drive is now from shaft 32 through gears 36 and 78 to the shaft 60, and from the latter through gear 75 to gear 76 which is now coupled with the driven shaft 77. For the third speed, clutches C3 and C4 are engaged and the other clutches are disengaged. This connects gear 34 to drive shaft 32 so that the gear 74 is driven and the gear 75, integral with 74, drives gear 76 and hence shaft 77 since the clutch C4 is engaged. For the fourth speed, clutches C1 and C5 are operated valves to a valve port 148 adjacent the upper end of the valve VD and communicating with the space provided above the upper land 147. Hence this upper land 147 and the adjacent upper portion of the valve body 146 constitute a piston or fluid actuated means for operation of the valve. When fluid under pressure is supplied to the port 148, the valve body 146 is moved downwardly against the force of a spring 149 provided between the lower end of the body and a plug 150 which closes the valve chamber or bore. The spring 149 normally urges the valve body 146 to its upper or non-operated position as indicated in Fig. 8.

A portion of the housing 91 on which the valve block 119 is mounted is provided with a vertically extending bore forming the chamber for a pressure relief valve 151. This valve comprises a valve body 152 which is slidable within the aforementioned bore in the housing 91 and is urged downwardly therein by a spring 153 received in a bore formed in the upper end of the valve body and acting against a removable plug 154. Adjacent its lower end the valve body 152 has a conical shaped portion which merges with a reduced diameter portion 155. The portion 155 is adapted to enter into a reduced diameter portion of the bore and engage the upper end of a pin-like portion 156 of a fluid actuated member that also includes enlarged diameter portion 157. The portion 157 is integral with the pin-like portion 156 and is slidable in a bore of corresponding diameter extending upwardly from the lower end of the housing member 91, this latter bore being closed by a plug 158.

The upper portion of the bore for the body 152, adjacent the conical lower end of the body 152, has an opening or port 159 through which fluid under pressure from a suitable source of supply, such as a pump, is admitted and this fluid under pressure acts upon the valve body tending to move it against the force of the spring 153. Hence, when the pressure of the fluid rises to a predetermined value, determined by the selected strength of the spring 153, the valve moves upwardly to a position at least partially uncovering an outlet port 160 and the resulting flow of fluid therethrough prevents further increase in its pressure as will be readily understood.

In accordance with this invention, the fluid actuated portion 157 on the pin 156 is provided to effect actuation of the pressure relief valve 151 during the braking operation so that the pressure of the fluid supplied to the clutches C4 and C5 is less than that employed for engaging these and the other clutches while the latter are utilized to effect driving of the shaft 77 and spindle 24. This reduced pressure is desirable to prevent grabbing of the clutches and damage thereto, the reduced pressure being sufficient to effect a relative rapid stopping of the spindle with a "cushioning" type of action. As will hereinafter appear, when the valves are actuated to engage both clutches C4 and C5, fluid pressure is supplied to a port 161 in the housing member 91 beneath the portion 157 on the pin member 156 thereby tending to move the latter upwardly and the valve 151 against the force of the spring 153 in addition to the force exerted on the valve body 152 by the pressure of the fluid entering through the port 159. Due to the increased area thus provided for operation thereon by the fluid under pressure, the force acting upon the valve body 152 is sufficient to move the valve body 152 against the force of the spring 153 at a lesser pressure than when fluid is not supplied to the port 161. By suitable calibration of the size of the conical surface of the valve body 152 and the active surface of the enlarged portion 157, the resulting pressure of the fluid can be made in the order of one-half that utilized for engagement of the clutches to transmit power to the spindle. In addition to the ports 160 and 161, valve 151 is also provided with ports 162 and 163 which are connected to suitable passages or conduits for conducting any fluid passing by the valve body 152 or the portion 157 on the pin 156 from the upper portions of the bores in which these bodies are located, this fluid being drained back to the source of supply.

As mentioned heretofore, the mounting plate 120 is provided with a plurality of openings and grooves to effect transmission of the fluid under pressure to and from the valves VA, VB, VC and VD. The nature of these passageways and the interconnections provided therewith through the valves to effect control of the clutches is schematically represented in Fig. 9 wherein each of the valve bodies of the valves is indicated together with a diagrammatic representation of the fluid pressure system including the source of fluid under pressure, the pressure relief valve, and the like. In this figure the valve ports have, for convenience, been shown as disposed on both sides of each valve body with solid lines through the valve bodies indicating those ports which are in communication when the valves are in the non-operated positions. The broken lines in the valve body representations illustrate the connections established between the major ports of the valves when the valve bodies have been moved to their operated positions. The actual physical nature of the several valves and the intercommunicating grooves and openings in the plate member 120 are illustrated in Figs. 5 through 8, 12 and 13 from which it will be seen that all of the valve ports for the valves are provided at one side of the valve bodies, as drilled openings through the valve block 119 with these openings cooperating with the grooves and openings in plate 120. It will also be hereinafter apparent that the valve block 119 has additional openings or ports for the valves which are not shown in Fig. 9 and which are provided to permit drainage of fluid from the valves since such fluid, if allowed to remain therein, might interfere with proper operation of the valves.

Referring now in detail to Figs. 5 through 9, 12 and 13, it will be noted that fluid for the control system is received in a reservoir 164 provided at a suitable location in the base of the housing comprising the frame 22 of the machine. This fluid is withdrawn from the reservoir and delivered under pressure to the control mechanism by a fluid pump 165, the outlet of which is connected by a conduit 166 to an opening 167 in the mounting plate 120, see Figs. 9, 12 and 13. This opening 167 communicates with the inlet port 168 of valve VB, see Fig. 5. As shown in Fig. 13, a groove 169 on the face of the plate 120 adjacent the housing 91 is also in communication with the opening 167 and this groove communicates with an opening 170 through the plate, which opening is aligned with an inlet port 171 for the valve VA, see Fig. 6.

In the non-operated position of valve VA, the fluid under pressure from the port 171 is free to pass between the two adjacent spaced lands of the valve body 121 and through the outlet port 172 which is in communication with a groove 173 on that face of the plate 120 which is adjacent the valve block 119, see Figs. 6 and 12. This groove 173 communicates with an inlet port 174 of the valve VC, see Fig. 7. The groove 173 also communicates with an inlet port 175 of the valve VD, see Fig. 8, which port is however blocked in the non-operated position of the valve VD by the adjacent lands of the valve body 146. In the non-operated position of valve VC however the fluid under pressure supplied to the port 174 can pass to an adjacent outlet port 176 and is communicated therefrom through a groove 177 to the inlet port 148 of valve VD so that fluid pressure is supplied above the uppermost land 147 on the body 146 thereby operating the valve body 146 to its lower or operated position.

The movement of the valve body 146 to its operated position establishes communication between port 175 and the adjacent port 178 of valve VD and the latter communicates through a groove 179 on plate 120 with an inlet port 180 of the valve VB, see Fig. 5. In the non-operated position of this latter valve, the fluid under pressure from port 180 can freely pass to the adjacent port 181 and from the latter through the opening 182 in the plate 120 thence, by suitable conduit means, to the opening 93 through which the pressure is applied to clutch C5, see Fig. 2. The fluid under pressure supplied through the groove 179 is also admitted through the port 185 of the valve VB but this port is blocked in the non-operated position of the valve as will be evident from Fig. 5. However, fluid under pressure supplied through the opening 167 and port 168 to the valve VB may pass at this time through a port 183 and an opening 184 in the plate 120 to suitable conduit means connected with the opening 92 through which the fluid under pressure is supplied to the clutch C4, see Fig. 2. Consequently both clutches C4 and C5 are engaged when the three solenoid operated valves are in their non-operated positions.

At this time fluid pressure is also supplied from the groove 179 through an opening 186 in the plate 120, see Figs. 12 and 13, to the port 161 of the fluid pressure controlling mechanism, see Fig. 4, and acts upon the portion 157 tending to move this and the pin 156 upwardly thereby adding to the movement of the valve body 152 which would normally result from the fluid pressure supplied through the port 159. Consequently, the valve body 152 moves to uncover the port 160 under lesser pressure than is the case when both clutches C4 and C5 are not engaged so that the braking is effected without excessive grabbing of the clutches.

The uncovering of port 160 by movement of the valve body 152 of the pressure controlling mechanism supplies fluid under pressure to suitable conduit means, such as indicated at 187 and 188 in Fig. 9, which communicate with a conventional spray tube or spray ring and with a drain to the reservoir 164 as will be well understood by those skilled in the art. The spray ring or spray tube, schematically indicated in Fig. 9, supplies fluid in a mist or spray for lubrication of the transmission and other operative parts of the machine tool within the housing thereof.

As indicated in Fig. 9, at least a portion of the fluid which issues from the spray ring or tube is collected in a sump 189. This sump is located at an elevated position with respect to the clutches C2 and C3 and the fluid thus collected flows from this sump through conduit means 190 to an opening 191 in the plate 120 which is in communication with a port 192 of valve VD, see Fig. 8. This port, in the non-operated position of the valve, communicates with a port 193 that in turn is in communication with a groove 194 and an opening 195 in the plate 120 from which suitable conduit means are connected to the opening 48 in the annular member surrounding a portion of the shaft 32. Hence fluid from the sump 189 can flow through the previously described passageways in the shaft 32 to enter the clutch C3. The head of liquid thus supplied is, however, insufficient to operate the clutch and the purpose of this supply of fluid is simply to provide lubrication of the plain bearing for the gear 34.

In a similar manner, a groove 196 communicating with the opening 191 conducts fluid by gravity to another opening 197 in the plate 120 and this latter opening communicates with a port 198 in the valve VC, see Fig. 7. The port 198, in turn, communicates with a port 199 in the non-operated position of the valve body and the fluid thus supplied passes through an opening 200 in the plate 120 and through suitable conduit means, including a groove 201 in the plate 120 and pipes or the like not shown, to the opening 49 in the annular member 47 surrounding the spindle 32 so that fluid from the sump enters the clutch C2 and lubricates the bearing for the gear 36 in the same manner as described for clutch C3 and its gear 34.

The operating chamber of clutch C1 communicates through the openings in the shaft 60 and conduit means, not shown, connected to the opening 72, see Fig. 2, with an opening 202 in the plate 120. From this opening, a groove 203 in the plate extends to a port 204 of the valve VD. In the non-operated position of this valve, the port 204 communicates with a port 205 and the latter communicates with groove 206 in the plate 120 which in turn extends to a port 207 of valve VA. In the non-operated position of this valve, the port 207 communicates with a port 208 and the latter is in communication with a groove 209 in the plate 120. One end of this groove terminates in an opening 210 through the plate and is connected by suitable means back to the reservoir 164 so that the clutch C1 is connected to drain.

Also communicating with the groove 209 is a port 211 of valve VA located adjacent the bottom of that valve to provide a drain for any fluid which may have been trapped by the valve body and which might interfere with its operation. To provide for drainage from the upper portion of the valve, the valve body 121 has a vertically extending bore 212 therethrough communicating with an opening 213 above the uppermost land of the valve so that any fluid trapped above this land is likewise drained. The bodies 122 and 123 of valves VB and VC are likewise provided with similar vertically extending bores and communicating openings above the uppermost lands for drainage purposes and the lower portion of these valves are likewise connected to drain. Thus, valve VB has a drain port 214 communicating with a suitable drain groove 215 and drain opening 216 in the mounting plate 120, see Figs. 5, 12 and 13. Similarly, the lower portion of the valve VC has a drain port 217 communicating with the aforementioned drain groove 209 and drain opening 210.

In its operated position, valve VA is adapted to have the port 172, and hence the groove 173, communicate with a port 218 which is aligned with a drainage opening 219 in plate 120. Hence, when this valve is actuated and valve VC is not operated, the application of fluid under pressure to valve VD through the previously described path is terminated. Valve VD can then return to its non-operated position since the fluid employed in the prior operation thereof is now drained from the upper portion of the valve through the passageway 177 and the ports 176, 174 of valve VC, passageway 173 and ports 172 and 218 of valve VA. The return of valve VD to its non-operated position connects clutch C5 to drain through ports 181, 180 of valve VB, groove 179 and ports 178, 220 of valve VD since the latter port is connected with a drainage opening 221 and groove 222 in plate 120. The fluid beneath portion 157 of the fluid pressure regulating mechanism is likewise drained through this same path.

When valve VA is actuated, fluid under pressure can enter therein from the conduit 166 and groove 169 and flow through ports 171 and 207 to the groove 206 and from the latter through the ports 205 and 204 of valve VD, if the latter not be actuated, to the clutch C1 thereby engaging this clutch. However, if valve VC has also been energized fluid under pressure can then flow from the groove 206 and through a port 223 of valve VC, see Fig. 7, to port 176 and thence through groove 177 to port 148 of valve VD thereby actuating the latter. When this occurs the operation of valve VD places ports 205 and 193 in communication so that fluid under pressure is supplied to clutch C3. At this time, port 204 will be in communication with a port 220 of valve VD which is connected to drain through the opening 221 and groove 222 in the plate 120. Also, the region beneath the portion 157 of the fluid pressure regulating mechanism will then be connected to drain through ports 178 and 175 of valve VD, groove 173 and ports 172 and 218 of valve VA. Hence, the pressure of the fluid supplied to clutch C1 or C3 is at the high value since the pressure relief valve 151 is now acted on only by fluid entering port 159.

When valve VA is not operated and valve VC is operated, fluid under pressure is supplied from port 171 of valve VA through port 172 and groove 173 to port 174 of valve VC. Since valve VC is operated, port 199 is uncovered and hence the fluid passes therethrough and through opening 200, groove 201 to and through conduit means connected to the opening 49 and is thereby supplied to clutch C2 operating the latter. Valve VD is not operated since the port 148 is now connected to drain through ports 176 and 223 of valve VC and ports 207 and 208 of valve VA. Moreover, the pressure of the fluid supplied to clutch C2 is at the high value since the port 161 of the pressure regulating mechanism is connected to drain through ports 178 and 220 of valve VD. Clutch C4 is also operated since fluid under pressure flows through ports 168 and 183 of valve VB to opening 92 communicating through the bore of shaft 77 with the chamber of the clutch. The operation of valve VC has, of course, terminated the connection of clutch C2 to the sump but clutch C3 remains connected thereto while clutches C1 and C5 are connected to drain as will be readily apparent from a study of Fig. 9.

If valve VA is not operated and valves VB and VC are operated, the clutch C2 will be engaged, and clutches C1 and C3 will not be engaged in the manner described in the preceding paragraph. However, the operation of valve VB will now effect engagement of clutch C5 and disengagement of clutch C4. Thus, fluid under pressure is now supplied from port 168 of valve VB to port 181 thereof and thence through conduit means, not shown, to opening 93 which communicates through the bore of shaft 77 with clutch C5. Clutch C4 will simultaneously be connected to drain through ports 183 and 185 of valve VB, groove 179 and ports 178 and 220 of valve VD which, it will be remembered, is not operated. Also, the region below portion 157 of the fluid pressure regulating means is connected to drain through the path just described for connection of clutch C4 to drain so that clutches C2 and C5 are engaged by fluid under the high pressure controlled solely by valve 151.

The paths by which selective actuation of the valves VA, VB, VC and VD are established to operate the several clutches for providing any of the six speeds of shaft 77 or braking thereof will now be apparent from consideration of Fig. 10 in conjunction with Figs. 4 to 9, and 11 to 13. However, by way of simplification and review the mode of functioning of the control mechanism for two of the operations of the transmission will be described with reference to Figs. 14 and 15. The schematic representations in these figures are similar to that employed in Fig. 9 with the fluid path for the condition described shown in heavy lines.

Let it be assumed first that the operator desired to have the drive shaft 77 and hence the spindle held stationary. This requires, with reference to Fig. 10, that clutches C4 and C5 be simultaneously engaged and it will also be observed from this figure that this is effected by deenergizing each of the three solenoids. Therefore the control switch 131 is operated to the "off" position and consequently the valves VA, VB and VC will be in the nonoperated positions illustrated in Figs. 6, 5 and 7, respectively. In this position of the valves, fluid under pressure is supplied from the pump 165 through the conduit 166 to the passageway 169 and passes in through the port 171 of valve VA and out through port 172 to the groove 173. From the groove 173 this fluid enters valve VC through port 174 and passes out through port 176 to groove 177. Hence, fluid under pressure is admitted through the port 148 to the upper end of the fluid pressure operated valve VD actuating the latter to its operated position. This moves the valve body 146 so that the fluid entering this valve through groove 173 and port 175 can now pass through port 178 to groove 179 and thus enter valve VB through port 180 passing therefrom through port 181 to the conduit means connected with clutch C5 thereby engaging the latter.

Fluid under pressure is also supplied from the conduit 166 to the valve VB through port 168 leaving this valve through port 183 and thereby passing through the conduit means connecting the port to valve C4 so that the latter is likewise engaged. The pressure of the fluid in the system at this time is reduced from that normally present for effecting power transmission since the fluid flowing through the groove or passageway 179 is also applied to the port 161 of the fluid pressure regulating mechanism thereby assisting the fluid pressure entering the pressure relief valve 151 through port 159 to move the valve body 152 against the force of the spring 153. This movement of the pressure relief valve uncovers the port 160 so that fluid can flow to the spray ring and back to the reservoir. Simultaneously, the clutch C1 will be connected to drain and clutches C2 and C3 connected to sump 189 through the ports and passageways which have been described in the above detailed description of the physical embodiment of the mechanism.

Assuming the operator now wishes to release the brake and have the driven shaft 77 operated at the first speed, it will be observed with reference to Fig. 10 that solenoid SVA is to be energized. The operator can secure this result simply by positioning switch 131 to the first position thereof so that contact 132 engages contact 133 thereby energizing the solenoid SVA and moving the valve body 121 of valve VA to operated position. As indicated in Fig. 15, this supplies fluid under pressure from the pump 165 through conduit 166 and groove 169 to port 171 of valve VA. Since this valve is now operated, port 171 is in communication with port 207 so that the fluid under pressure flows through groove 206 to valves VC and VD. Valve VC is not operated, however, and hence port 223 is blocked from the other ports of the valve and hence no fluid is transmitted through this valve so that valve VC is not operated. However, the fluid flowing through groove 206 enters valve VD through port 205 and leaves the valve through port 204 and groove 203 passing therefrom to and through the conduit means connected with clutch C1 to engage the latter.

Fluid under pressure is also supplied from the conduit 166 through the opening 167 of the valve mounting plate 120 entering valve VB through port 168. Since this valve is also not operated, the fluid entering through port 168 can pass through port 183 and opening 184 to the conduit means connected with clutch C4 so that this clutch likewise is engaged. Therefore, power is now transmitted from the drive shaft 32 through gears 57 and 58 to the shaft 60, due to the engagement of clutch C1, and from the shaft 60 this power is transmitted through gears 75 and 76 to the driven shaft 77 since the clutch C4 is now engaged. Therefore, the spindle 24 is now rotated through the gears connecting the driven shaft 77 to the spindle, see Fig. 2, this driving being at either the high or low range depending upon the position of the gears 112 and 113 as the result of initial setting thereof.

At this time clutches C2, C3 and C5 are not engaged with clutches C2 and C3 receiving fluid from the sump 189 to effect lubrication of their associated gears 36 and 34, as explained above, and clutch C5 connected to drain. The fluid employed for engaging clutches C1 and C4 is at the elevated pressure determined solely by the pressure relief valve 151 since no fluid is now communicated to groove 179 and hence the fluid actuated pin 156 does not operate upon the pressure relief valve. Therefore, the valve body 152 is moved against the force of its spring 153 solely by the pressure of the fluid entering through the port 159, a portion of this fluid released through port 160 being supplied to the spray ring as will be readily understood.

The operation of the control mechanism to actuate the transmission for providing each of the other speeds can be traced in a similar manner which will now be apparent and hence need not be described in detail. Suffice it to note that, to secure a selected speed, the operator need only position the switch 131 to the position corresponding to the speed desired whereupon the solenoid operated valves will be selectively energized in accordance with the chart shown in Fig. 10 to provide selected operation of these valves and/or of the fluid pressure operated valve VD to produce engagement of the clutches, as is also indicated in the chart in Fig. 10, thereby bringing into action the proper gears of the gear train for providing the selected speed.

Although this invention has been described in detail with respect to the manner in which the control mechanism may be actuated by a single manually operated electrical switch, it will be apparent that the transmission and its controlling mechanism may be preselected in its operation with the preselected conditions thereafter initiated by employing switch means and switch actuators similar to those disclosed in the aforementioned Curtis et al. Patent 2,644,222. When such switch means are employed the switch 131 here shown is removed from the circuit. This switch is useful, however, even in such an arrangement when it is desired to control the operation manually and it and the switch means of Patent 2,644,222 may be provided in a single machine tool and wired for alternate utilization. These and other variations and adaptations of the mechanism here disclosed will be readily apparent to those skilled in the art and, consequently, the invention is not limited to the exact details of construction and mode of operation herein set forth except as may be required by the spirit and scope of the appended claims.

Having thus described the invention, I claim:

1. In a machine tool, a control mechanism for operating a plurality of fluid actuated devices two at a time in selected order comprising, a plurality of individually operable two position electromagnetically actuated valves, a fluid operated valve, the total number of valves being one less than the number of devices controlled, a source of fluid under pressure, conduit means connecting said source of pressure to two of said electro-magnetically operated valves and outlets of one of the latter to the inlets of said fluid pressure operated valve and of another of said electromagnetically operated valves, other conduit means connecting the outlets of said other electromagnetically actuated valve to said fluid pressure actuated valve for operation of the latter and to one of said fluid actuated devices, still other conduit means connecting outlets of said fluid pressure actuated valve and of the other of the first two mentioned electromagnetically actuated valves to the devices to be actuated, and means for selective energization of said electromagnetically actuated valves.

2. In a machine tool, a transmission for providing a plurality of different speeds of a driven shaft for a given speed of the driving shaft comprising a plurality of constantly meshed gears adapted to be selectively utilized to provide different speed ratios between the driving and driven shafts, a plurality of fluid operated clutches operable to render selected ones of said gears effective for power transmitting relationship between the driving and driven shafts, a source of fluid under pressure, a plurality of two-position valves at least one of which is fluid pressure operated and the others of which are solenoid operated, the number of said valves being one less than the number of said clutches, conduit means interconnecting said valves with each other and between the said source of fluid under pressure and the said clutches, and means for selectively energizing said solenoid operated valves.

3. In a machine tool, a transmission comprising a drive shaft, a driven shaft, a plurality of constantly meshed gears adapted to provide a plurality of different speed ratios between the drive and driven shafts, a plurality of fluid operated clutches for selectively coupling certain of said gears in power transmitting relationship between said drive and driven shafts, a source of fluid under pressure, a plurality of two-position multiple passage valves for controlling the flow of fluid under pressure from said source to said clutches, means responsive to fluid pressure for operating one of said valves, separate solenoid means for operating each of the others of said valves, conduit means connecting an outlet of one of the solenoid operated valves to the means for operating said fluid pressure operated valve, other conduit means controlled by the said fluid pressure operated valve and by the solenoid operated valves for controlling delivery of fluid under pressure from said source to said clutches, and means for effecting selective energization of the solenoids of said solenoid operated valves.

4. The combination as defined in claim 3 wherein two of said clutches are provided upon the driven shaft and adapted to be simultaneously operated to effect a braking action on the latter, means controlling the pressure of fluid delivered from said source to said valves, and means acting upon said pressure controlling means for effecting a reduction in the pressure of the fluid delivered from said source when the clutches are actuated to effect braking of the driven shaft.

5. The combination as defined in claim 3 wherein two of said clutches are provided upon the driven shaft and adapted to be simultaneously operated to effect a braking action on the latter, a pressure relief valve connected to said source of fluid under pressure to provide a predetermined pressure in said conduit means for effecting clutch engagement resulting in driving of said driven shaft, fluid pressure actuated means acting on said relief valve to operate the latter at a lesser pressure, and conduit means for supplying fluid pressure to the last-mentioned fluid operated means when both of the said two clutches are actuated, whereby engagement of the clutches for braking action is effected by fluid under lesser pressure than that employed for effecting driving of the driven shaft.

6. The combination as defined in claim 3 wherein said transmission is provided in a housing having at least one end thereof accessible, and means removably supporting said valves and solenoid means on the said end of the housing, the said mounting means including a plate member common to all of said valves and provided with passages comprising conduit means interconnecting said valves.

7. In a machine tool having a transmission comprising a drive shaft and a driven shaft with a plurality of constantly meshed gears therebetween and a plurality of fluid actuated clutches to effect selective utilization of said gear trains thereby selectively providing a plurality of different speeds of the driven shaft relative to the speeds of the drive shaft or braking of said driven shaft, a control for said transmission comprising a plurality of valves each including a multiple passage valve body movable from one to the other of two positions, a separate electromagnetic means for individually operating the valve bodies of all but one of said valves, means for actuating the valve body of the other of said valves by fluid pressure, a source of fluid under pressure, conduit means interconnecting said valves between said source of fluid under pressure and said clutches to control operation of the latter, the said conduit means including a connection of the outlet ports of some of said valves to inlet ports of others of the valves and connection of one outlet port of an electromagnetically operated valve to the means for actuating said fluid pressure operated valve, and means for selectively energizing said electromagnetic means to effect selected operation of the associated valves and thereby provide braking of said driven shaft or a selected speed of the latter relative to the speed of the drive shaft.

8. The combination as defined in claim 7 and further comprising means controlling the pressure of fluid delivered from said source to the conduit means, and means acting upon said pressure controlling means for effecting a reduction in the pressure of the fluid delivered from said source when the clutches are actuated to effect braking of the driven shaft.

9. In a machine tool, having a gear transmission comprising a drive shaft and a driven shaft with a plurality of constantly meshed gears therebetween adapted to provide a plurality of different ratio gear trains between the shafts and a plurality of fluid actuated clutches to effect selective utilization of said gear trains thereby providing a plurality of different speeds of the driven shaft relative to the speeds of the drive shaft or braking of said driven shaft, a control for said transmission comprising four valves each including a multiple passage valve body movable from one to the other of two positions, a separate electromagnetic means for operating each valve body of three of said valves, means for actuating the valve body of the other of said valves by fluid pressure, a source of fluid under pressure, conduit means connecting said source of fluid under pressure to inlet ports of two of said electromagnetically operated valves, conduit means connecting outlet ports of one of said two electromagnetically operated valves to inlet ports of said fluid pressure operated valve and to inlet ports of the third of the electromagnetically operated valves, conduit means connecting one outlet port of the last-mentioned valve to the means for actuating said fluid pressure operated valve, conduit means connecting one outlet port of the fluid pressure operated valve to an inlet port of the other of said two electromagnetically operated valves, conduit means connecting other outlet ports of said fluid operated valve and of said other and said electromagnetically operated valves respectively to separate ones of the said fluid operated clutches, and means for selectively energizing said electromagnetic means to effect selected operation of the associated valves and thereby selectively provide braking of said driven shaft of predetermined speeds of the latter relative to the speed of the drive shaft.

10. In a machine tool, having a gear transmission including a drive shaft and a driven shaft with a plurality of constantly meshed gears therebetween adapted to provide a plurality of different ratio gear trains between the shafts and five fluid actuated clutches to effect selective utilization of said gear trains thereby providing six different speeds of the driven shaft relative to the speeds of the drive shaft or braking of said driven shaft, a control for said transmission comprising four valves each including a multiple passage valve body movable from one to the other of two positions, a separate electromagnetic means for operating each of the valve bodies of three of said valves, means for actuating the valve body of the other of said valves by fluid pressure, two of said electromagnetically operated valves each having two fluid pressure inlet ports and two fluid pressure outlet ports, the third electromagnetically operated valve having a single fluid pressure inlet port and two fluid pressure outlet ports, the said fluid pressure operated valve having two fluid pressure inlet ports and three fluid pressure outlet ports, a source of fluid under pressure, conduit means connecting said source of fluid under pressure to one of the inlet ports of one of said two electromagnetically operated valves and to the inlet port of said third electromagnetically operated valve, conduit means connecting the outlet ports of said third electromagnetically operated valve to the inlet ports of said fluid pressure operated valve and to the inlet ports of the other of said two electromagnetically operated valves, conduit means connecting one outlet port of the last-mentioned valve to one of the said fluid operated clutches and the other outlet port to the means for actuating said fluid pressure operated valve, conduit means connecting one outlet port of the fluid pressure operated valve to the other inlet port of said one of the two electromagnetically operated valves, conduit means connecting the other outlet ports of said fluid operated valve respectively to separate ones of the said fluid operated clutches, conduit means connecting the outlet ports of said one of said two electromagnetically operated valves respectively to two separate ones of said fluid pressure operated clutches, and means for selectively energizing said electromagnetic means to effect selected operation of the associated valves and thereby provide braking of said driven shaft or a selected speed of the latter relative to the speed of the drive shaft.

11. The combination as defined in claim 10 and further comprising fluid pressure actuated means connected to that conduit means interconnecting said one outlet port of the fluid pressure actuated valve to an inlet port of said one of the two electromagnetically operated valves and operative to reduce the fluid pressure delivered to the clutches.

12. The combination as defined in claim 10 wherein two of said clutches are provided upon the driven shaft and adapted to be simultaneously operated to effect a braking action on the latter, a pressure relief valve connected to said source of fluid under pressure to provide a predetermined pressure in the conduit means for effecting clutch engagement resulting in driving of said driven shaft, fluid pressure actuated means acting on said relief valve to operate the latter at a lesser pressure, and conduit means for supplying fluid pressure to the last-mentioned fluid operated means when both of said two clutches are actuated, whereby engagement of the clutches for braking action is effected by fluid under lesser pressure than that employed for effecting driving of the driven shaft.

13. In a machine tool, a transmission comprising a drive shaft, two gears rotatably supported on said shaft and a third gear connected to said shaft for rotation therewith, a first fluid actuated clutch on the drive shaft operative to connect said first gear for rotation with the drive shaft, a second fluid actuated clutch on the drive shaft operative to connect said second gear for rotation with the drive shaft, a countershaft, a first gear connected for rotation with said countershaft and meshing with the said first gear on the drive shaft, a second gear on the countershaft connected for rotation with the countershaft and meshing with the said second gear on the drive shaft, a third gear rotatably supported on said countershaft and meshing with the said third gear on the drive shaft, a fluid actuated clutch on the countershaft operative to connect the said third gear on the countershaft to the latter for rotation therewith, a driven shaft, a first gear rotatably supported on said driven shaft and meshing with the said first gear on said countershaft, a second gear rotatably supported on said driven shaft and meshing with said second gear on said countershaft, a first fluid actuated clutch on said driven shaft operative to connect the said first gear on said driven shaft to the latter for rotation therewith, a second fluid actuated clutch on said driven shaft operative to connect the said second gear on the driven shaft to the latter for rotation therewith, a source of fluid under pressure, three solenoid operated two position valves, a single fluid pressure operated valve, conduit means connecting said source of fluid under pressure to the inlets of two of said solenoid operated valves and the outlets of one of the latter respectively to the clutches on said driven shaft, conduit means connecting the outlets of the other of said two valves to the inlets of said third solenoid operated valve and said fluid pressure operated valve, conduit means connecting the outlets of said third solenoid operated valve respectively to one of the said clutches on the drive shaft and to the fluid pressure responsive portion of the fluid pressure operated valve for actuation of the latter, conduit means connecting two of the outlets of said fluid pressure operated valve respectively to the other of said clutches on said drive shaft and to the clutch on said countershaft, conduit means connecting another outlet of said fluid operated valve to an inlet of the valve controlling the clutches on said driven shaft, and means for selectively energizing said solenoid operated valves to effect either simultaneous actuation of both of said clutches on the driven shaft and disengagement of the other clutches thereby providing a braking action or selective energization of either one of said clutches on the driven shaft and any one of the other clutches to thereby provide a plurality of different speeds of the driven shaft.

14. The combination as defined in claim 13 and further comprising a pressure relief valve connected to said source of fluid under pressure to provide a predetermined pressure in said conduit means, and means controlled by said third actuated valve and acting on said relief valve to operate the latter at a lesser pressure.

15. In a machine tool, a transmission comprising a drive shaft, two gears rotatably supported on said shaft and a third gear connected to said shaft for rotation therewith, a first fluid actuated clutch on the drive shaft operative to connect said first gear for rotation with the drive shaft, a second fluid actuated clutch on the drive shaft operative to connect said second gear for rotation with the drive shaft, a countershaft, a first gear connected for rotation with said countershaft and meshing with the said first gear on the drive shaft, a second gear on the countershaft connected for rotation with the countershaft and meshing with the said second gear on the drive shaft, a third gear rotatably supported on said countershaft and meshing with the said third gear on the drive shaft, a fluid actuated clutch on the countershaft operative to connect the said third gear on the countershaft to the latter for rotation therewith, a driven shaft, a first gear rotatably supported on said driven shaft and meshing with the said first gear on said countershaft, a second gear rotatably supported on said driven shaft and meshing with said second gear on said countershaft, a first fluid actuated clutch on said driven shaft operative to connect the said first gear on said driven shaft to the latter for rotation therewith, a second fluid actuated clutch on said drive shaft operative to connect the said second gear on the driven shaft to the latter for rotation therewith, a source of fluid under pressure, three solenoid operated two position valves, a single fluid pressure operated valve, conduit means connecting said source of fluid under pressure to the inlets of two of said solenoid operated valves and the outlets of one of the latter respectively to the clutches on said driven shaft, conduit means connecting the outlets of the other of said two valves to the inlets of said third solenoid operated valve and said fluid pressure operated valve, conduit means connecting the outlets of said third solenoid operated valve respectively to one of the said clutches on the drive shaft and to the fluid pressure responsive portion of the fluid pressure operated valve for actuation of the latter, conduit means connecting two of the outlets of said fluid pressure operated valves respectively to the other of said clutches on said drive shaft and to the clutch on said countershaft, conduit means connecting another outlet of said fluid operated valve to an inlet of the valve controlling the clutches on said driven shaft, means connected with the last-mentioned conduit means for reducing the fluid pressure delivered from said source to the conduit means, and means for selectively energizing said solenoid operated valves to effect either simultaneous actuation of both of said clutches on the driven shaft and disengagement of the other clutches thereby providing a braking action or selective energization of either one of said clutches on the driven shaft and disengagement of the other clutches thereby providing a braking action or selective energization of either one of said clutches on the driven shaft and any one of the other clutches to thereby provide a plurality of different speeds of the driven shaft.

16. The combination as defined in claim 15 wherein a pressure relief valve is connected to said source of fluid under pressure to provide a predetermined pressure in the conduit means, and the said means for reducing the fluid pressure comprises a fluid pressure responsive means having a portion acting on said pressure relief valve to operate the latter at a lesser pressure than said predetermined pressure.

17. In a machine tool, a transmission for providing a plurality of different speeds of a driven shaft for a given speed of the driving shaft comprising a plurality of constantly meshed gears adapted to be selectively utilized to provide different speed ratios between the driving and driven shafts, a plurality of fluid operated clutches operable to render selected ones of said gears effective for power transmitting relationship between the driving and driven shafts, a source of fluid under pressure, a plurality of multiposition valves at least one of which is fluid pressure operated and the others of which are solenoid operated, the number of said valves being less than the number of said clutches, conduit means interconnecting said valves with each other and between the said source of fluid under pressure and the said clutches, and means for selectively energizing said solenoid operated valves.

References Cited in the file of this patent
UNITED STATES PATENTS

| | | |
|---|---|---|
| 1,921,380 | Barker | Aug. 8, 1933 |
| 2,582,088 | Walthers | Jan. 8, 1952 |
| 2,615,302 | Camerota | Oct. 28, 1952 |